US008141640B2

(12) United States Patent
Abad et al.

(10) Patent No.: US 8,141,640 B2
(45) Date of Patent: Mar. 27, 2012

(54) SYSTEM, METHOD AND APPARATUS FOR ENHANCING WELLBORE TREATMENT FLUID FLEXIBILITY

(75) Inventors: Carlos Abad, Richmond, TX (US); Hemant K. Ladva, Missouri City, TX (US); Lijun Lin, Sugar Land, TX (US); Yiyan Chen, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 271 days.

(21) Appl. No.: 12/511,182

(22) Filed: Jul. 29, 2009

(65) Prior Publication Data

US 2011/0028357 A1 Feb. 3, 2011

(51) Int. Cl.
*E21B 43/22* (2006.01)
(52) U.S. Cl. ........ 166/305.1; 166/53; 166/275; 507/904
(58) Field of Classification Search .................... None
See application file for complete search history.

(56) References Cited

U.S. PATENT DOCUMENTS

| | | | | |
|---|---|---|---|---|
| 3,827,499 A | * | 8/1974 | Norton et al. ............. | 166/305.1 |
| 4,232,739 A | * | 11/1980 | Franklin ...................... | 166/275 |
| 4,269,975 A | * | 5/1981 | Rutenberg et al. ............ | 536/114 |
| 4,378,049 A | * | 3/1983 | Hsu et al. ....................... | 166/295 |
| 5,363,916 A | * | 11/1994 | Himes et al. ................... | 166/276 |
| 6,488,091 B1 | * | 12/2002 | Weaver et al. ................. | 166/300 |
| 7,104,328 B2 | * | 9/2006 | Phillippi et al. ............ | 166/308.5 |
| 7,351,681 B2 | | 4/2008 | Reddy et al. | |
| 7,497,263 B2 | | 3/2009 | Parris et al. | |
| 2003/0196809 A1 | * | 10/2003 | Willberg et al. ............. | 166/300 |
| 2004/0206498 A1 | * | 10/2004 | Phillippi et al. ............. | 166/278 |
| 2006/0028914 A1 | * | 2/2006 | Phillippi et al. ............. | 366/279 |
| 2009/0023614 A1 | * | 1/2009 | Sullivan et al. .............. | 507/214 |
| 2009/0023615 A1 | | 1/2009 | Chen et al. | |

* cited by examiner

*Primary Examiner* — George Suchfield
(74) *Attorney, Agent, or Firm* — Robin Nava; Daryl Wright; Jeremy Tillman

(57) ABSTRACT

A method includes performing a chemical process to create a chemical product and an amount of heat, and transferring the heat to a first fluid. The method further includes hydrating a polymer in the first fluid, and adding the chemical product from the chemical process to the first fluid to create a treatment fluid. The method further includes diluting the treatment fluid with respect to at least one constituent of the treatment fluid. The method includes treating a formation of interest in a wellbore with the treatment fluid. The method includes changing a formulation of the treatment fluid during the treating. The method also includes extending the treating beyond a design amount, or ending the treatment before the design amount and preserving some reagents of the chemical process.

26 Claims, 6 Drawing Sheets

SYSTEM, METHOD AND APPARATUS FOR ENHANCING WELLBORE TREATMENT FLUID FLEXIBILITY

BACKGROUND

The technical field generally relates to treatment fluids for production or injection wells, and more particularly but not exclusively relates to treatment fluids including a hydrated polymer. Treatment fluids including a polymer generally require hydration of the polymer to develop the desired viscosity for the treatment. Typically, the polymer based treatment fluid is created in a batch in advance of commencing the treatment. Many wells intersect formations that are sensitive to fresh water and the treatment fluids for such wells include a clay stabilizer such as a potassium chloride or other brine. The brines utilized for the treatment fluids are also often created in a batch in advance of commencing the treatment. Presently available systems for generating treatment fluids result in a long overall treatment cycle from the time of fluid creation to the time of the completion of the treatment. Additionally, presently available systems are relatively inflexible to treatment fluid design changes in real time, which can result in insufficient treatment fluid available during a treatment or in an excessive treatment fluid remainder, and have a relatively inflexible treatment fluid temperature. Excessive remaining treatment fluid introduces increase cost, resource consumption, and imposes disposal costs and risks. Therefore, further technological developments are desirable in this area.

SUMMARY

One embodiment is a unique method for rapidly hydrating a wellbore treatment fluid. Other embodiments include unique systems and apparatus to rapidly adjust wellbore treatment parameters. Further embodiments, forms, objects, features, advantages, aspects, and benefits shall become apparent from the following description and drawings.

DESCRIPTION OF THE ILLUSTRATIVE EMBODIMENTS

Figure 1:
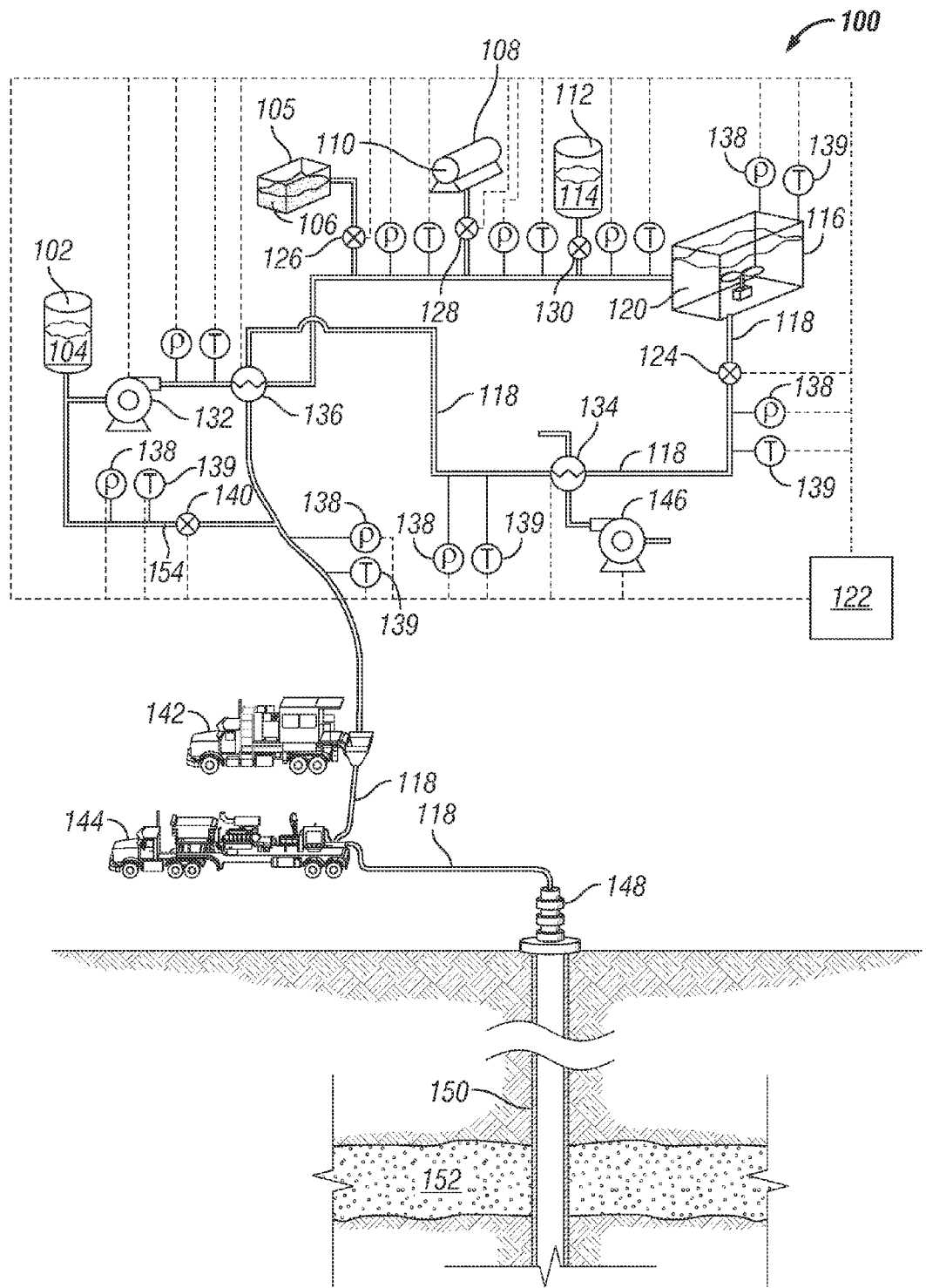
FIG. 1 is a schematic diagram of a system for enhancing wellbore treatment fluid flexibility.

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

FIG. 1 is a schematic diagram of a system 100 for enhancing wellbore treatment fluid flexibility. The system 100 includes a fluid source 102 that provides a first fluid 104, a base source 105 that provides a base material 106, and an acid source 108 that provides an acid material 110. The base material 106 may be an anhydrous base, a base precursor, and/or a concentrated base. Non-limiting examples of base materials 106 include base material includes sodium hydroxide, potassium hydroxide, ammonia, tetramethyl ammonium hydroxide, and/or cesium hydroxide. The base materials 106 may be clay stabilizer precursors, and other non-limiting examples of base materials 106 include sodium, potassium, magnesium, sodium hydride, lithium hydride, calcium hydride, magnesium hydride, a metal, a metal hydride, and/or a metal oxide. The acid material 110 may be an anhydrous acid, an acid precursor, and/or a concentrated acid. Non-limiting examples of acid materials 110 include HCl(g), HCl (aq), HBr(g), HBr(aq), HI(g), HI(aq), and/or formic acid. In certain embodiments, the base materials 106 and/or acid materials 110 are present in more than one form or concentration, allowing, for example, temperature control of the first fluid 104 entering a hydration vessel 116 by varying the temperature generated (e.g. by heat of mixing and/or heat of dissolution) in the first fluid 104.

The system 100 further includes a polymer source 112 that provides a polymer material 114. The polymer material includes any polymer known in the art, such as xanthan, hydroxy-ethyl-cellulose, guar, carboxy-methyl-hydroxy-propyl-guar, a poly-saccharide, a poly-saccharide derivative, a poly-acrylamide, a poly-acrylamide co-polymer, diutan, hydroxyl-propyl guar, and/or a synthetic polymer. The polymer material 114 may be added in any form known in the art, including at least a powder and a hydrocarbon-based slurry (e.g. slurried in oil, organic solvent, or diesel).

The presence of, and order of, each of the sources 105, 108, 112 is optional. For example, the acid source 108 may occur before the base source 105, and/or the first fluid 104 may include any of the acid, base, and/or polymer materials 106, 110, 114 with the remaining materials 106, 110, 114 added to the first fluid 104 such that heat is generated, a dynamic polymer level is achieved, and/or a dynamic clay stabilizer concentration is achieved.

The system 100 further includes a hydration vessel 116 fluidly coupled to the fluid source 102, the base source 105, the acid source 108, and the polymer source 112. The system 100 further includes a fluid conduit 118 fluidly coupled to the material sources 105, 108, 112 on an upstream side and fluidly coupled to a treatment pump 144 on a downstream side. The fluid conduit 118 further continues to the wellhead 148. The hydration vessel 116 is illustrated as a continuous stirred tank reactor (CSTR) having a volume and an amount of treatment fluid 120 therein. However, the hydration vessel 116 may be any type of vessel including the fluid conduit 118, from any portion downstream of where all of the materials 106, 110, 114 are added, up to and including a portion of the wellbore 150 volume. For example, where the fluid pumping rate of the pump(s) 144 is 30 barrels per minute (bpm) and the hydration vessel 116 comprises 45 barrels of total volume of fluid conduit 118 plus wellbore 150 volume above a formation of interest 152, there is a potential residence time of 90 seconds available for the treatment fluid 120 after the mixing of the materials 106, 110, 114. In another example, where the fluid pumping rate of the pump(s) 144 is 30 bpm and the hydration vessel comprises a 60 barrel capacity CSTR, there is a potential residence time of 120 seconds available for the treatment fluid 120 after the mixing of the materials 106, 110, 114, if the downstream fluid conduit 118 and wellbore 150 volumes are ignored.

One of skill in the art will understand the tradeoffs between using a tank as a hydration vessel 116 and utilizing the fluid conduit 118 and/or wellbore 150 volume as the hydration vessel 116. Generally, and without limitation, the use of a tank or CSTR allows for more precise control of the composition, temperature, and polymer hydration level of the treatment fluid 120, provides for a uniform treatment fluid 120 exiting the hydration vessel 116, and provides for smooth transitions in composition, temperature, and polymer hydration level. Utilization of the fluid conduit 118 and/or wellbore 150 volume allows for more responsive changes to the composition, temperature, and polymer hydration level of the treatment fluid 120 as well as providing for less equipment and a more limited footprint on the location of the system 100. In certain embodiments, the hydration vessel 116 comprises the volume of the tank, the fluid conduit 118, and/or the wellbore 150 volume.

The system 100 further includes a controller 122. The controller 122 is a portion or all of a processing subsystem that executes certain operations for enhancing treatment fluid flexibility. The controller 122 may include a computer program product on a computer readable medium that performs operations for enhancing treatment fluid flexibility. The controller 122 may include aspects in hardware and/or software, may include portions on a computer, portions hardwired, and/or portions executed by an operator (not shown), and the controller 122 may be a single device or a two or more distributed devices that operate simultaneously and/or intercommunicate via datalinks, networks, electronic signals, and/or wireless communications.

The exemplary controller 122 is in communication with one or more fluid streams—for example via density sensors 138 and/or temperature sensors 139. The controller may further be in communication with one or more devices such as the hydration vessel 116, a fluid delivery pump 132, and/or a heat exchanger pump 146. The controller may be in communication with any sensor, device, or actuator in the system 100, and the sensors 138, 139 may not all be present, and additional sensors not shown may be present. The selection of sensors to support functions of the controller 122 is a mechanical step for one of skill in the art and is not discussed in detail herein except where such detail may enhance clarity.

The exemplary system 100 further includes a bypass line 154 (flowing through bypass valve 140) fluidly coupling a diluted fluid (e.g. the first fluid 104) to the treatment fluid 120 downstream of the hydration vessel 116. The bypass line 154 is illustrated as joining the fluid conduit 118 just before a blender 142. In certain embodiments, where the hydration vessel 116 includes portions of the fluid conduit 118 or even portions of the wellbore 150 volume, the bypass line 154 may join at a later point. Examples of joining points include, without limitation, points downstream of the blender 142, downstream of the pump 144, and/or within the wellbore 150. In one example, the diluted fluid is pumped down one of a tubing or an annulus, the treatment fluid 120 is pumped down the other, and the fluids are joined within the wellbore 150. There are no limitations as to how many joinder points the bypass line 154 may have with the main treatment line, or where the fluids may be joined. However, the inclusion of the diluted fluid with the treatment fluid 120 will generally bring the temperature of the treatment fluid 120 back down and slow hydration, so the joinder point is a design criteria based on the amount of time the treatment fluid 120 is supposed to maintain an elevated temperature.

In certain embodiments, the system 100 further includes one or more heat exchangers 136, 134 thermally coupled to the fluid conduit 118. The heat exchangers 136, 134 provide the controller 122 with actuators to control a temperature of the treatment fluid 120 at the wellhead 148. In one example, the controller 122 controls the heat exchanger(s) 136, 134 such that a temperature of the treatment fluid 120 exiting the fluid conduit 118 at the wellhead 148 is not more than 10° C. warmer than a temperature of the first fluid 104. A first heat exchanger 134 transfers heat to the ambient environment, and the heat exchanger pump 146 controls a rate of heat transfer through the heat exchanger 134 by varying an amount of ambient air through the first heat exchanger 134.

A second heat exchanger 136 transfers heat from the treatment fluid 120 at a position where it is no longer needed to the first fluid 104 entering the hydration vessel 116. The heat transferred in the heat exchanger 136 is heat provided from the chemical process that heated fluid in the hydration vessel 116. The heat exchanger 136 can be controlled by varying exchange area, by a partial or complete bypass on either the first fluid 104 or treatment fluid side 120 (not shown) or by other mechanisms known in the art. The heat exchangers 134, 136 are exemplary only and may be of any type.

The controller 122 controls a flow rate of a treatment fluid 120 from the hydration vessel 116 in response to a specified pumping rate. The controller 122 further controls a flow rate of the first fluid 104, the base material 106, the acid material 110, and the polymer material 114 into the hydration vessel 116 such that the treatment fluid 120 residing in the hydration vessel includes a specified salt concentration, and such that an average residence time of the treatment fluid 120 in the hydration vessel 116 is at least equal to a hydration time. The hydration time may be a time for the fluid to achieve a specified percentage of full hydration at the temperature within the hydration vessel 116.

Figure 3:
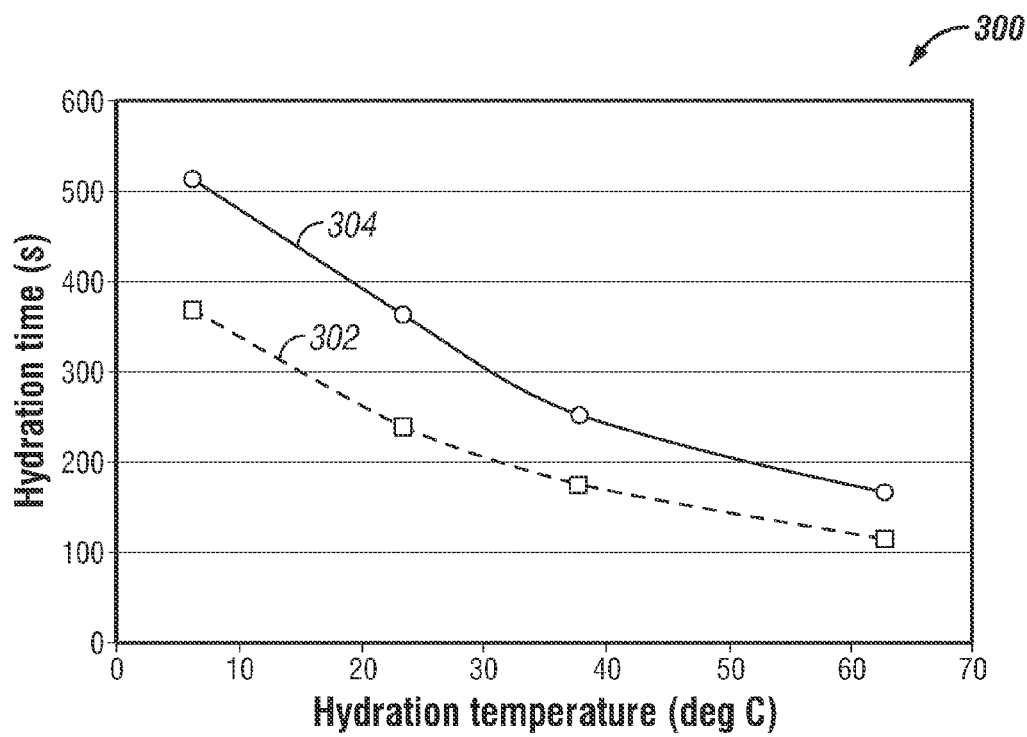
FIG. 3 is an illustration of a hydration time versus hydration temperature for a fluid.

For example, referencing FIG. 3, an illustration 300 shows a first curve 302 showing a time to 80% hydration and a second curve 304 showing a time to 90% hydration. It is seen in the illustration that the hydration time decreases dramatically with elevated temperature. The data in the illustration 300 is exemplary for one set of conditions only, but similar data is easily obtained as a matter of standard rheological testing by one of skill in the art. Data such as that in the illustration 300 can be utilized to determine a match of hydration vessel 116 volume, hydration time, and treatment fluid temperature 220 to achieve the desired hydration. Typically, the fluid pumping rate of the treatment is a value fixed for other reasons and is not a design criterion for sufficient hydration of the treatment fluid 120. Therefore, in certain embodiments, one of the treatment fluid temperature or the hydration vessel 116 volume is fixed, and the appropriate hydration curve 302, 304 (or other curve where 80% or 90% are not the desired hydration criteria) determines the hydration time. In real time during a treatment, the controller 122 can modulate the hydration vessel 116 volume (e.g. by maintaining a higher or lower fluid level in the hydration vessel 116) and the treatment fluid 120 temperature to ensure the treatment fluid 120 achieves the designed hydration amount. The controller 122 controls the treatment fluid 120 temperature by any one or more of the following behaviors: utilizing a more concentrated acid material 110 and/or base material 106, utilizing a lower percentage of treatment fluid 120 and a greater percentage of fluid from the bypass line 154, modulating a heat exchange amount in the first heat exchanger 134, and/or modulating a heat exchange amount in the second heat exchanger 136.

Figure 4:
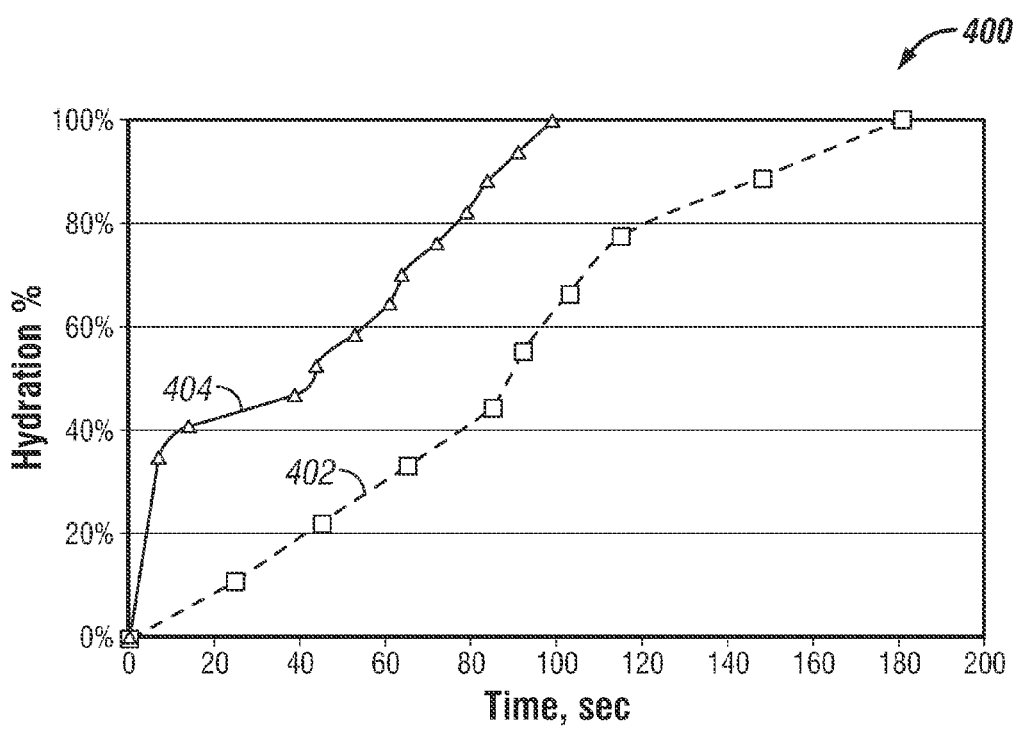
FIG. 4 is an illustration of a hydration progress verses time for a fluid.

Referencing FIG. 4, a first curve 402 illustrates a polymer hydration percentage at an ambient temperature, and a second curve 404 illustrates the polymer hydration percentage at an elevated temperature (66° C. in the example). The data in the illustration 400 is exemplary for one set of conditions only, but similar data is easily obtained as a matter of standard rheological testing by one of skill in the art. Data such as that in the illustration 400 can be utilized by the controller 122 to ensure that sufficient hydration is achieved during the treatment. In further example to those above, the controller 122 may have a stored range of hydration percentages acceptable during transition periods and the like, and may utilize data such as that in the illustration 400 to manage transitions. In a non-limiting example, a treatment pumping rate change occurs that the controller 122 determines will result in a treatment fluid 120 temperature increase for sufficient hydration to occur. The controller 122 may determine that a move to 70% is temporarily acceptable, according to pre-determined criteria, during the transition as the treatment fluid 120 temperature is raised. The controller 122 may interpolate between available data, and/or the included data may have additional curves beyond those illustrated. An exemplary controller 122 is explained in greater detail in relation to the description referencing FIG. 2.

The data illustrated in FIGS. 3 and 4 is not needed for certain embodiments of the system 100. The controller 122 can control to fixed design points determined ahead of time, and/or can respond to changes in pumping rates, brine concentrations and/or polymer loading amounts according to pre-defined criteria. However, data such as that illustrated in FIGS. 3 and 4, when available to the controller 122, can provide for more flexible response from the controller 122.

For embodiments where fluid is flowing in the hydration vessel 116, the determinations (e.g. the temperature, salt concentration, or the hydration percentage) for the fluid residing in the hydration vessel 116 are considered at a design point where the fluid is expected to have the specified salt concentration and be sufficiently hydrated. For example, if the specified pumping rate is 30 bpm, and a flow through a bypass valve 140 is 24 bpm, the controller 122 controls the flow rates of the first fluid 104, the base material 106, the acid material 110, and the polymer material 114 such that the fluid leaving the hydration vessel 116 combined with the fluid through the bypass valve 140 is a total of 30 bpm at the specified salt concentration. If the hydration vessel 116 is further considered to include a first 1,000 feet of the wellbore 150, the controller 122 further controls a temperature of the treatment fluid 120 such that sufficient hydration is achieved by 1,000 feet into the wellbore 150.

While the system 100 is illustrated mixing an acid material 110 and a base material 106 into a first fluid 104, the system 100 can include any chemical process that generates heat and thereby accelerates hydration of the polymer material 114. For example, a polymerization reaction can occur, where the product of the polymerization reaction and the heat of the polymerization reaction are included in the treatment fluid 120. A non-limiting example of a polymerization that can be used includes the addition of one or more of the monomers selected from acrylates, methacrylates, acrylic acid, and methacrylic acid. In one example, acrylic acid is polymerized into polyacrylic acid, and the heat and reaction product from the polymerization are included in the treatment fluid 120. In another example, a condensation polymerization is performed (e.g. using phenol formaldehyde) and the resulting heat and product are included in the treatment fluid 120.

The heat of the chemical process and the product of the chemical process can be added to the treatment fluid 120 at separate times, for example the heat may be added first, or they may be added simultaneously. In additional or alternative embodiments, the system 100 can include a process that allows the brine concentration in the treatment fluid 120 to be altered in real-time, and/or a process that allows a concentration of the polymer material 114 in the treatment fluid to be altered in real-time. Further, the system 100 can include a process that allows a temperature of the treatment fluid 120 at the wellhead 148 to be altered in real-time. The implementations of these features are understood to one of skill in the art having the benefit of the disclosures herein.

The system 100 is illustrated at a standard land location. However, the location may be any type of location known in the art. For example, and without limitation, the location may be contained on a rig (e.g. in an environmentally sensitive area), on a skid, on a truck, on a ship, and/or on a sea based platform. In certain embodiments, the system 100 is especially useful where disposal of treatment fluid 120 is expensive or unacceptable, and/or where physical space is limited.

Figure 2:
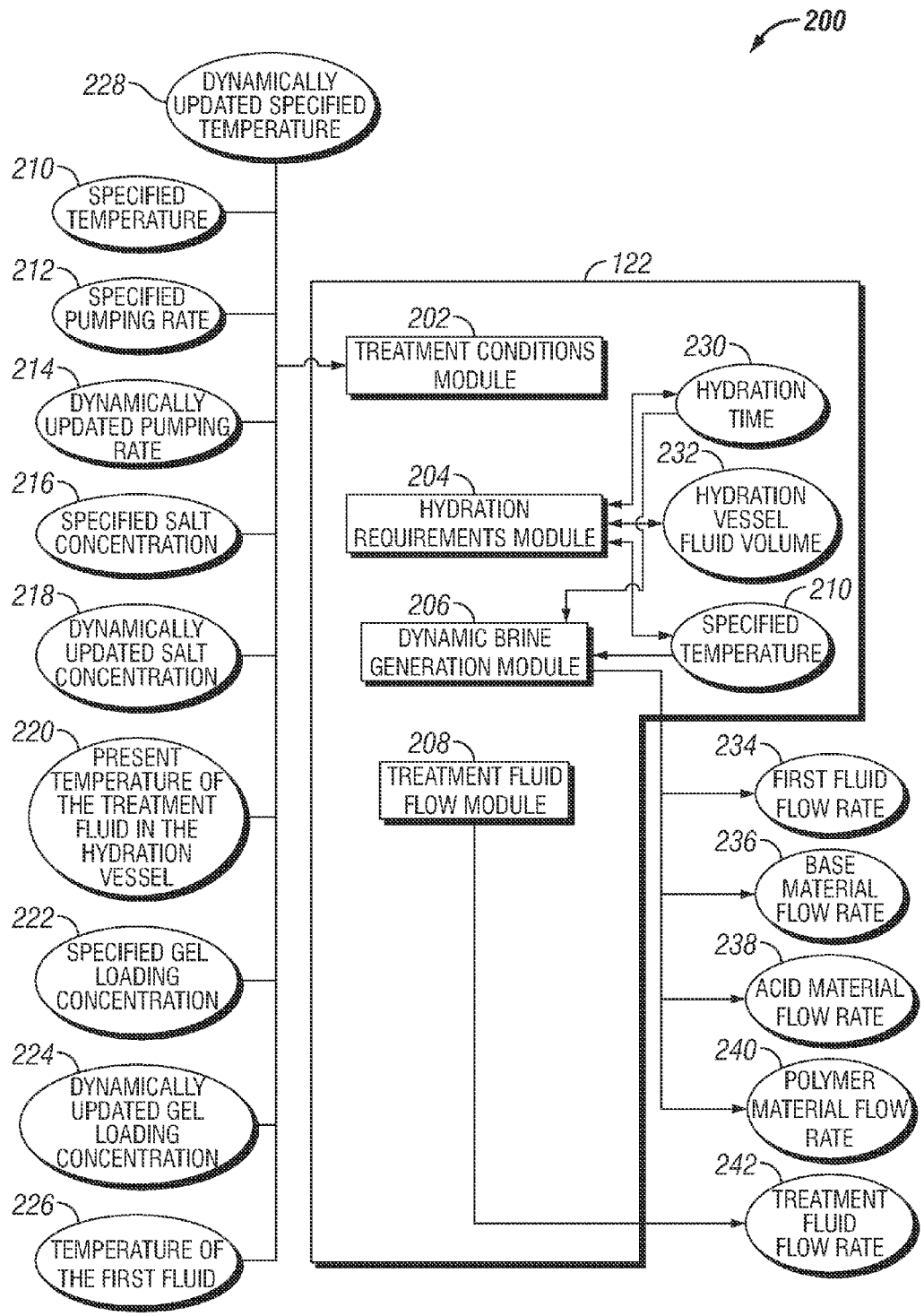
FIG. 2 is a schematic diagram of a processing subsystem that executes certain operations for enhancing wellbore treatment fluid flexibility.

FIG. 2 is a schematic diagram of a processing subsystem 200 including a controller 122 that executes certain operations for enhancing wellbore treatment fluid flexibility. The exemplary controller 122 includes modules structured to functionally execute operations for enhancing treatment fluid flexibility. The description herein includes the use of modules to highlight the functional independence of the features of the elements described.

A module may be implemented as operations by software, hardware, or at least partially performed by a user or operator. In certain embodiments, modules represent software elements as a computer program encoded on a computer readable medium, wherein a computer performs the described operations when executing the computer program. A module may be a single device, distributed across devices, and/or a module may be grouped in whole or part with other modules or devices. The operations of any module may be performed wholly or partially in hardware, software, or by other modules. The presented organization of the modules is exemplary only, and other organizations that perform equivalent functions are contemplated herein. Modules may be implemented in hardware and/or software on computer readable medium, and modules may be distributed across various hardware or software components.

The controller 122 includes a treatment conditions module 202 that interprets a specified pumping rate 212 and a specified salt concentration 216. Interpreting includes any determination of the parameters by any means, including at least receiving a signal from a sensor, receiving a user input, reading a value from a computer memory location, receiving a value from a network or datalink communication, receiving a value from an electronic signal, and/or calculating a value based upon other available parameters. The controller 122 further includes a hydration requirements module 204 that determines a hydration vessel fluid volume 232 and/or a specified temperature 210 in response to the specified pumping rate 212. The specified temperature 210 appears twice, because the specified temperature 210 may be an input received at the treatment conditions module 202 and/or an output of the hydration requirements module 204. Where the specified temperature 210 is a design constraint, it will appear as an input, but may be further modified by the hydration requirements module 204.

The controller 122 further includes a dynamic brine generation module 206 that controls a first fluid flow rate 234, a base material flow rate 236, an acid material flow rate 238, and/or a polymer material flow rate 240 in response to the specified salt concentration 216 and further in response to the hydration vessel fluid volume 232 and/or the specified temperature 210. The controller 122 further includes a treatment fluid flow module 208 that controls a treatment fluid flow rate 242 in response to the specified pumping rate 212. The dynamic brine generation module 206 and the treatment fluid flow module 208 may utilize any control scheme known in the art—for example the treatment fluid flow module 208 may control a valve and/or pump out of the hydration vessel to achieve the treatment fluid flow rate 242, or the portion of the treatment fluid flow rate 242 that is not attributable to the diluted fluid. The dynamic brine generation module 206 may utilize a PID controller or other scheme to maintain a fluid level, brine concentration, and/or present temperature of the treatment fluid 220 in the hydration vessel.

The dynamic brine generation module 206, in certain embodiments, includes control elements tailored to the system 100 that reflect the design priorities of the system 100. For example, the dynamic brine generation module 206 may include feedforward models of heats of dissolution, heats of mixing, and/or heats of reaction to determine the temperature effects of the various streams entering the hydration vessel, and further may include a schedule of parameter priorities to manage transitions as real-time treatment requirements impose changes on the system. For example, and without limitation, the dynamic brine generation module 206 may draw down (or allow an increase in) the hydration vessel volume preferentially to allowing the brine concentration or treatment fluid temperature 220 to vary, and may increase or decrease the treatment fluid to dilute fluid ratio to maintain the fluid compositions preferentially to changing the hydration vessel volume. Further, the dynamic brine generation module 206 may evaluate cost factors, such as allowing minor variations in the treatment fluid temperature 220 preferentially to invoking a high concentration base material that may allow greater heat generation but may be expensive. The provided control behaviors are exemplary only, and alternate or additional behaviors known in the art may be included. The selection of control schemes, prioritization, and cost optimization for the operations of the dynamic brine generation module 206 and the treatment fluid module 208 are understood to those of skill in the art with knowledge generally available regarding a target system 100 combined with the benefit of the disclosures herein.

In an exemplary embodiment, the treatment conditions module 202 interprets the specified temperature 210, and the hydration requirements module 204 determines the hydration vessel fluid volume 232 in response to the specified pumping rate 212. In another exemplary embodiment, the treatment conditions module 202 interprets the hydration vessel fluid volume 232, and the hydration requirements module 204 determines the specified temperature 210 in response to the specified pumping rate 212. In certain embodiments, the hydration requirements module 204 determines a hydration time 230 in response to the specified temperature 210 and/or a present temperature of the treatment fluid 220 in the hydration vessel. The hydration time 230 may be utilized by the dynamic brine generation module 206 and/or the treatment fluid module 208 as a feedforward or feedback parameter, for example to adjust the flow rates 234, 236, 238, 240, to increase or decrease the treatment fluid temperature 220, to adjust the treatment fluid flow rate 242, and/or to allow the volume of fluid in the hydration vessel to change.

The specified temperature 210 may be a temperature determined to enhance a hydration time of the gel or polymer material into the treatment fluid. In certain embodiments, the specified temperature is a temperature at least 50° C. warmer than a temperature of the first fluid 226, a temperature of at least 65° C., and/or a temperature determined in response to an available volume of the hydration vessel and the specified pumping rate. The specified temperature 210 may be obtained from data such as that depicted in the illustrations 300, 400 of FIGS. 3 and 4.

In an exemplary embodiment, the treatment conditions module 202 interprets a dynamically updated specified temperature 228, and the controller 122 responds to the dynamically updated temperature 228. In certain embodiments, the dynamic brine generation module 206 controls the flow rates 234, 236, 238, 240 in response to the dynamically updated specified temperature 228. In alternate or additional embodiments, the controller 122 modulates a heat exchange amount in the first heat exchanger 134 and/or the second heat exchanger 136 in response to the dynamically updated specified temperature 228. The ability to utilize a dynamically updated specified temperature 228 allows, without limitation, modulation of the hydration time 230 or response to changing downhole temperature during the treatment.

In an exemplary embodiment, the treatment conditions module 202 interprets a dynamically updated salt concentration 218, and the dynamic brine generation module 206 controls the flow rates 234, 236, 238, 240 in response to the dynamically updated salt concentration. The ability to dynamically adjust the salt concentration (and/or a clay stabilizer concentration) allows for improved well productivity and/or injectivity, and/or allows for a reduced chemical consumption and job cost, as well as reducing the chemical burden in any flowback fluid that may require treatment or disposal. For example, a salt concentration may be increased in portions of the treatment fluid that are expected to have significant exposure to the formation of interest. In the example, a salt concentration in the pad stage of a hydraulic fracturing treatment may be increased because a significant portion of that fluid is expected to contact or leak off into the formation, where the final stage of the fracture treatment may include a lower salt concentration. The described operations for utilizing a dynamically updated salt concentration 218 are exemplary and non-limiting.

During nominal operation, the treatment conditions module 202 determines a specified gel loading concentration 222 and the dynamic brine generation module 206 controls the flow rates 234, 236, 238, 240 such that the treatment fluid includes the specified gel loading concentration 222. In an exemplary embodiment, the treatment conditions module 202 interprets a dynamically updated gel loading concentration 224, and the dynamic brine generation module 206 controls the flow rate 240 of the polymer material into the hydration vessel further in response to the dynamically updated gel loading concentration 224.

The ability to dynamically adjust the gel loading allows for improved well productivity and/or injectivity, allows for a reduced chemical consumption and job cost, reduces the chemical burden in any flowback fluid that may require treatment or disposal, and allows for other adjustments to the treatment that are otherwise difficult or not possible. For example, reductions of gel loading in certain stages allow a reduced amount of crosslinker, breaker, or other additives in addition to less gel and damage being introduced into the formation of interest. The ability to change the gel loading also results in, for example, the ability to dynamically adjust the proppant schedule (e.g. going to a higher proppant concentration than a base gel loading would support), the ability to dynamically adjust a fluid viscosity, the ability to introduce slugs of very high gel loading for fluid diversion, and the ability to rapidly reduce the gel loading during an imminent screenout during a treatment. The described operations for utilizing a dynamically updated gel loading concentration 224 are exemplary and non-limiting.

Figure 5:
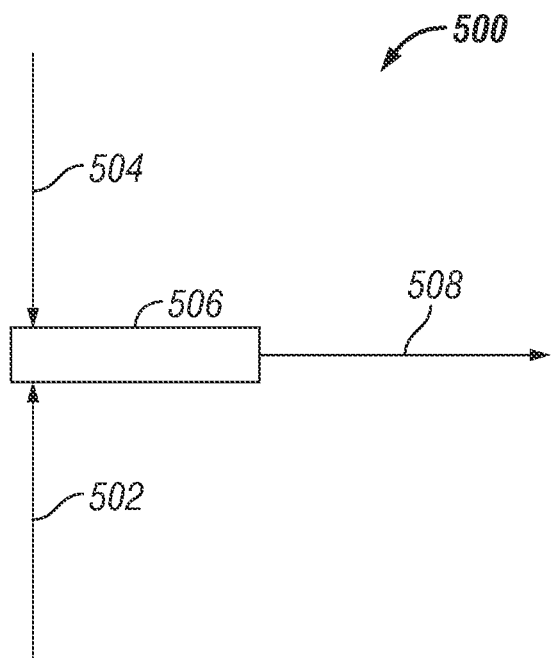
FIG. 5 is an illustration of performing a chemical process and transferring heat from the chemical process to a first fluid.

FIG. 5 is an illustration 500 of performing a chemical process and transferring heat from the chemical process to a first fluid. In the illustration 500, a first stream 502 is added to a second stream 504 at mixing location 506, and a resultant stream 508 includes a chemical product and an amount of heat from the chemical process. In one example, the first stream 502 is about 300 kg/min of water at a temperature of about 25° C., the second stream 504 is about 60 kg/min of anhydrous potassium hydroxide at about 25° C., and the resultant stream 508 is a 16.6% KOH(aq) solution at about 66° C. if heat losses to the environment are ignored. The resulting stream receives about 57,600 kJ/kg of the KOH dissolved into the water. The determinations of the exemplary streams, including the heat generated from dissolution, mixing, or reaction of the components, the enthalpies and heat capacities of all streams, and the resulting products and temperatures are mechanical steps for one of skill in the art. The determinations illustrated are examples similar to a feedforward model that may be utilized in a controller 122 to achieve the specified temperature 210.

Figure 6:
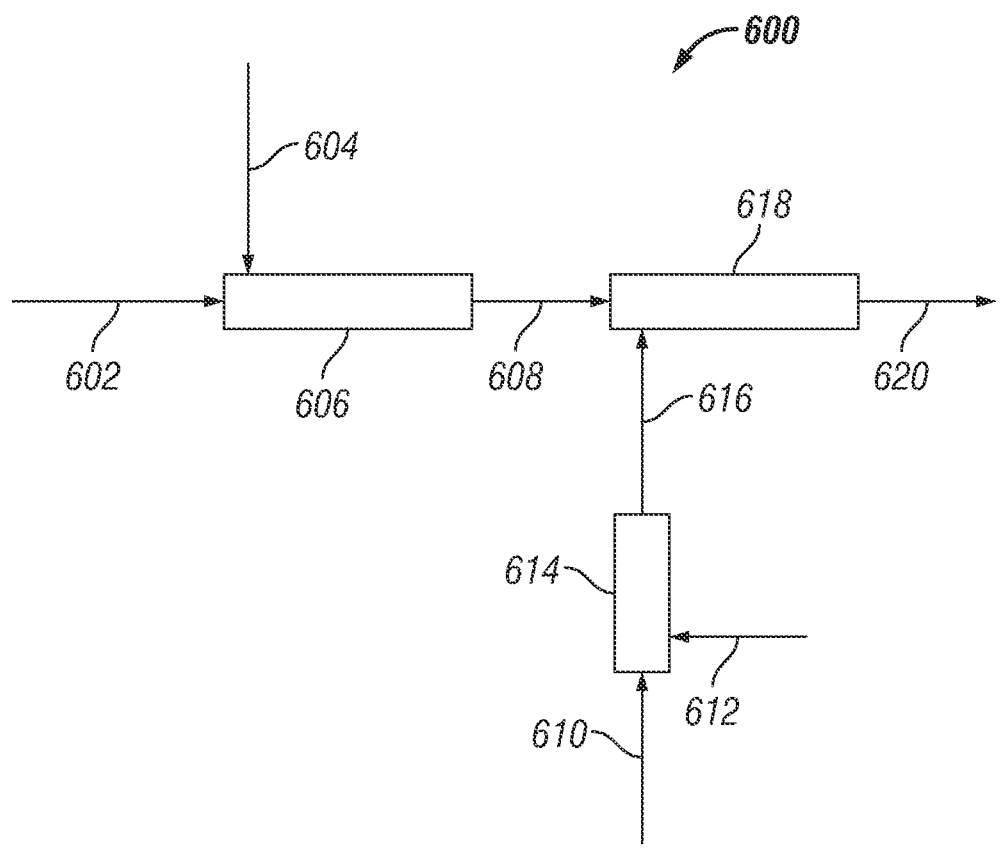
FIG. 6 is an illustration of performing a chemical process by adding the first chemical reactant to a first fluid and further adding a second chemical reactant to the first fluid.

FIG. 6 is an illustration of performing a chemical process and transferring heat from the chemical process to a first fluid. In the illustration 600, a first stream 602 is added to a second stream 604 at a first mixing location 606 and a first resultant stream 608 includes a first chemical product and a first amount of heat from the chemical process. A third stream 610 is added to a fourth stream 612 at a second mixing location 614 and a second resultant stream 616 includes a second chemical product and a second amount of heat from the chemical process. The first resultant stream 608 is added to the second resultant stream 616 at a third mixing location 618 and a third resultant stream 620 includes a third chemical product and a third amount of heat from the chemical process. The streams are added at various mixing locations 606, 614, 618 to isolate the heat contributions of the various chemical processes, but differing configurations of mixing locations, including adding of all streams directly into a hydration vessel, are contemplated herein.

In the example, the first resultant stream 608 is assumed to be similar to the resultant stream 508 referenced in relation to FIG. 5. The third stream 610 is anhydrous HCl(g) at about 39 kg/min and about 25° C., while the fourth stream 612 is about 400 kg/min of water at about 25° C. The addition of anhydrous HCl to water is known to generate about 74,840 kJ/kg HCl, so the a second resultant stream 616 is formed having 8.9% HCl(aq) at about 69° C. Further in the example, the addition of the first resultant stream 608 to the second resultant stream 616 releases about 55.20 kJ/kg KOH that is neutralized, resulting in the third resultant stream 620 which is a 10% KCl solution at about 85° C.

In the example, the hydration time to 90% for many polymers would be under about 100 seconds, so the hydration vessel volume where 90% hydration is the target would be sized around 1.67 times the bpm rate for the treatment. In the example, if the designed KCl concentration downstream of the hydration vessel was 2%, about 4 parts dilution fluid per part of treatment fluid in the hydration vessel would be added, resulting in a 2% KCl solution. In the example, if the dilution fluid is at a temperature of about 25° C., the resulting fluid after dilution would be about 37° C., neglecting heat losses. If it is desired that the final treating fluid be cooler, for example within about 10° C. of the first fluid and/or dilution fluid, various methods can reduce the final temperature, including at least a heat exchanger, utilization of concentrated acid and/or base rather than an anhydrous acid or base, utilization of an endothermic reaction in the chemical process, and/or an enhancement of the heat transfer from the system 100 to the ambient environment.

Figure 7:
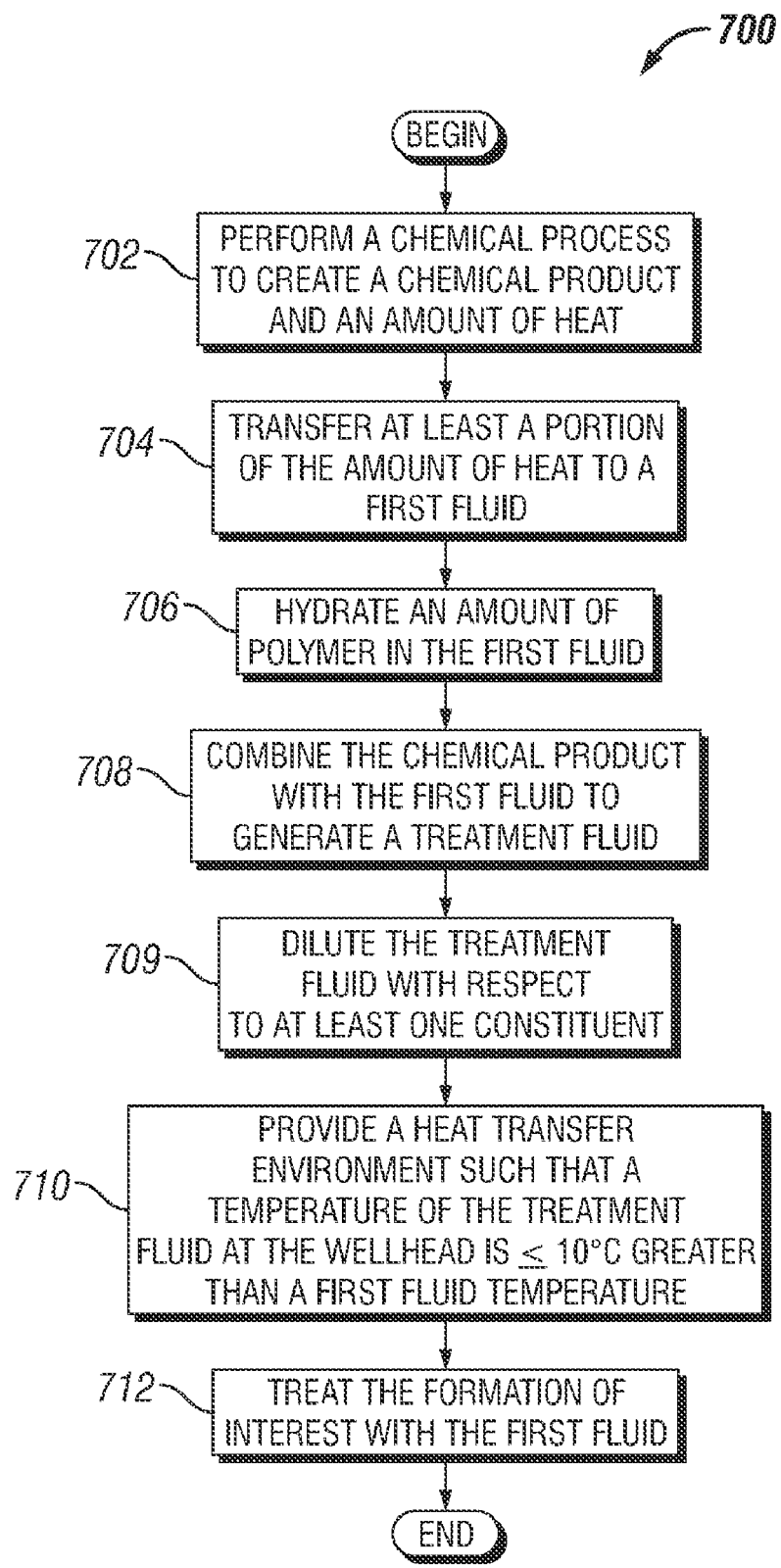
FIG. 7 is a schematic flow diagram of a process for enhancing wellbore treatment fluid flexibility.
Figure 8:
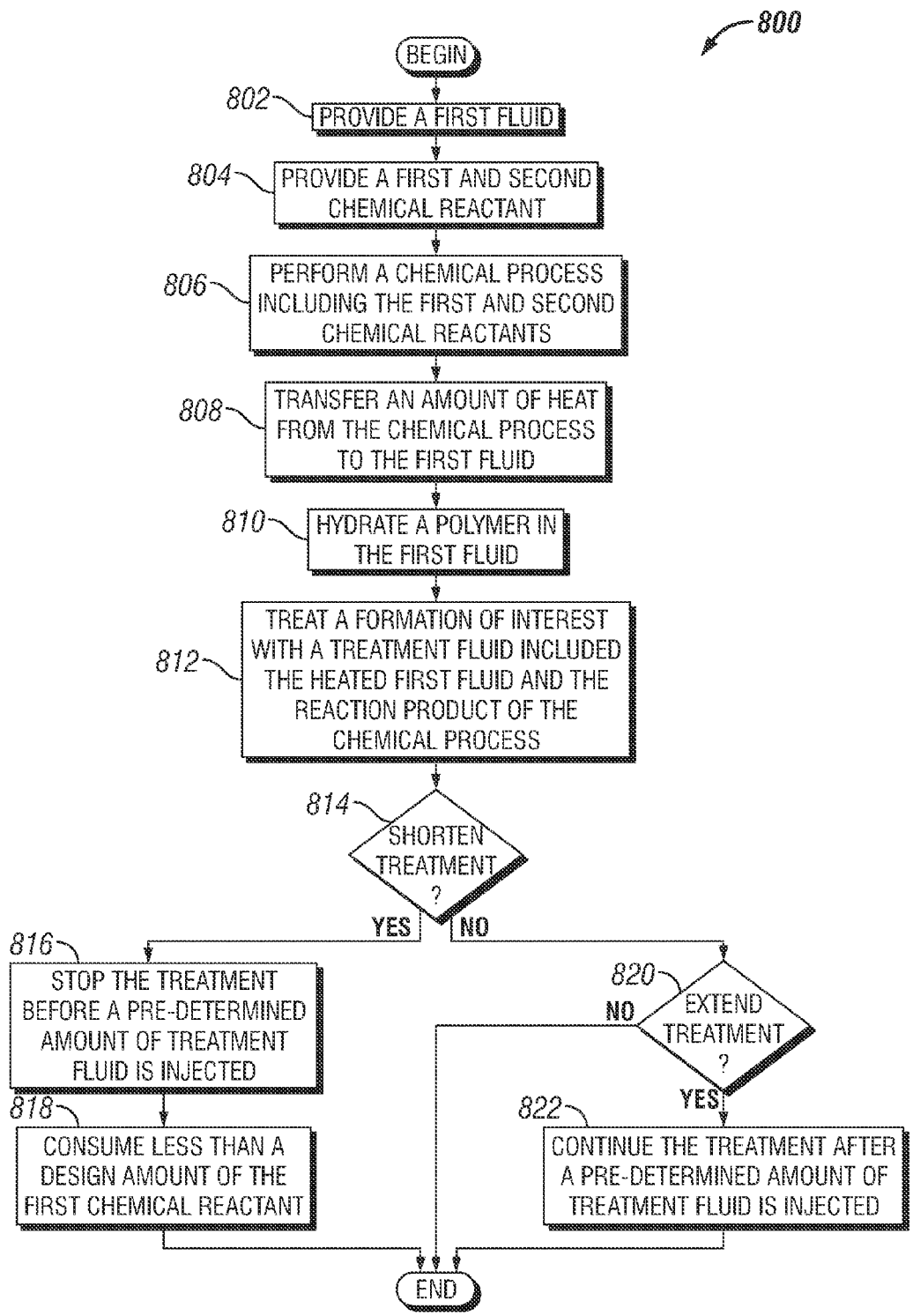
FIG. 8 is a schematic flow diagram of an alternate process for enhancing wellbore treatment fluid flexibility.

The schematic flow diagrams in FIGS. 7 and 8, and the related descriptions which follow, provide illustrative embodiments of performing procedures for enhancing the wellbore treatment fluid flexibility. Operations illustrated are understood to be exemplary only, and operations may be combined or divided, and added or removed, as well as re-ordered in whole or part, unless stated explicitly to the contrary herein.

FIG. 7 is a schematic flow diagram of a procedure 700 for enhancing wellbore treatment fluid flexibility. The procedure 700 includes an operation 702 to perform a chemical process to create a chemical product and an amount of heat, and an operation 704 to transfer at least a portion of the amount of heat to a first fluid. Examples of the amount of heat transferred to the first fluid include enough to heat the first fluid at least 50° C., enough to heat the first fluid to at least 65° C., and/or enough to heat the first fluid to a temperature wherein a polymer hydration can occur within an available hydration vessel volume at a specified pumping rate. The procedure 700 further includes an operation 706 to hydrate an amount of polymer in the first fluid, and an operation 708 to combine the chemical product with the first fluid to generate a treatment fluid. The exemplary procedure 700 further includes an operation 709 to dilute the treatment fluid with respect to at least one constituent. Non-limiting examples of the operation 709 include adding water to the treatment fluid to dilute a brine concentration and a gel concentration, adding a fresh water gel to the treatment fluid to dilute the brine concentration, and adding a brine to the treatment fluid to dilute the gel concentration.

The exemplary procedure 700 further includes an operation 710 to provide a heat transfer environment such that a temperature of the treatment fluid at a wellhead is ≦10° C. greater than a temperature of the first fluid. The procedure 700 includes an operation 712 to treat a formation of interest with the treatment fluid, where the formation of interest intersects a wellbore.

Non-limiting examples of chemical processes performed in the operation 702 to perform the chemical process include a solid dissolution, a gas dissolution, a liquid dissolution, a liquid dilution, and/or a chemical reaction. Alternate or additional chemical processes include mixing an acid with a base, where the chemical product is a salt such as sodium chloride, potassium chloride, ammonium chloride, tetramethyl ammonium chloride, calcium chloride, magnesium chloride, sodium bromide, calcium bromide, zinc bromide, potassium formate, cesium formate, and/or zinc chloride. Even further alternate or additional chemical processes include mixing an anhydrous base with water or a diluted base, diluting a concentrated base, mixing an anhydrous acid with water or a diluted acid, and/or diluting a concentrated acid. Still further alternate or additional chemical processes include inducing a polymerization reaction where the chemical product is a treatment fluid additive, and/or performing the chemical process by adding a salt to water or a dilute brine.

FIG. 8 is a schematic flow diagram of an alternate procedure 800 for enhancing wellbore treatment fluid flexibility. The procedure 800 includes an operation 802 to provide a first fluid and an operation 804 to provide a first and second chemical reactant. The first and second chemical reactants each include a reactant from the reactants including dilute acid, dilute base, concentrated acid, concentrated base, anhydrous acid, anhydrous base, a metal, a metal hydride, a metal oxide, and/or a monomer for a polymerization reaction. The procedure 800 further includes an operation 806 to perform a chemical process including the first and second chemical reactants, and an operation 808 to transfer an amount of heat from the chemical process to the first fluid. In certain embodiments, the operation 806 may include only one of the first and second chemical reactants. The operation 806 includes adding the first and second chemical reactants in any order, for example adding the second chemical reactant to the first fluid before the first chemical reactant, or adding the first and second chemical reactants simultaneously. The procedure 800 further includes an operation 810 to hydrate a polymer in the first fluid, and an operation 812 to treat a formation of interest with a treatment fluid including the heated first fluid and a chemical (or reaction) product of the chemical process. The procedure 800 may further include (not shown) an operation to dilute the treatment fluid with respect to at least one constituent of the treatment fluid.

The exemplary procedure 800 further includes an operation 814 to determine whether a treatment should be shortened. In response to the operation 814 indicating the treatment should be shortened, the procedure 800 includes an operation 816 to stop the treatment before a pre-determined amount of treatment fluid is injected into the well, and an operation 818 to consume less than a design amount of the first chemical reactant. The operation 818 to consume less than a design amount of the first chemical reactant includes having a usable amount of the first chemical reactant leftover that is readily available for use in a future treatment.

In response to the operation 814 indicating the treatment should not be shortened, the procedure 800 includes an operation 820 to determine whether to extend the treatment. In response to the operation 820 indicating the treatment should be extended, the procedure 800 includes an operation 822 to continue the treatment after a pre-determine amount of treatment fluid is injected. In certain embodiments, the operation 822 to extend the treatment includes extending the treatment such that at least 60 $m^3$ greater than the pre-determined amount of the treatment fluid is injected into the formation of interest.

As is evident from the figures and text presented above, a variety of embodiments according to the present invention are contemplated.

One exemplary embodiment is a method including performing a chemical process to create a chemical product and an amount of heat, transferring at least a portion of the amount of heat to a first fluid, and hydrating an amount of polymer in the first fluid. The method further includes combining the chemical product with the first fluid to generate a treatment fluid, and treating a formation of interest with the treatment fluid. The formation of interest intersects a wellbore. The method may further include diluting the treatment fluid with respect to at least one constituent of the treatment fluid, for example reducing a brine and/or gel concentration in the treatment fluid. The exemplary method further includes performing the chemical process as one of a solid dissolution, a gas dissolution, a liquid dissolution, a liquid dilution, and/or a chemical reaction. The method may include performing the chemical process by mixing an acid with a base, and the chemical product is a salt such as sodium chloride, potassium chloride, ammonium chloride, tetramethyl ammonium chloride, calcium chloride, magnesium chloride, sodium bromide, calcium bromide, zinc bromide, potassium formate, cesium formate, and/or zinc chloride. The method includes performing the chemical process by a process selected from: mixing an anhydrous base with water or a diluted base, diluting a concentrated base, mixing an anhydrous acid with water or a diluted acid, and/or diluting a concentrated acid.

In certain embodiments, the method includes performing the chemical process which includes adding a base material to water or a diluted base, where the base material is an anhydrous base and/or a concentrated base, and where the base material includes sodium hydroxide, potassium hydroxide, ammonia, tetramethyl ammonium hydroxide, and/or cesium hydroxide. In certain embodiments, the method includes performing the chemical process by adding an acid material to water or a diluted acid, where the acid material is an anhydrous acid and/or a concentrated acid, and where the acid material includes $HCl(g)$, $HCl(aq)$, $HBr(g)$, $HBr(aq)$, $HI(g)$, $HI(aq)$, and/or formic acid. Certain embodiments of the exemplary method include performing the chemical process which comprises adding a clay stabilizer precursor to water, where the clay stabilizer precursor is sodium, potassium, magnesium, sodium hydride, lithium hydride, calcium hydride, magnesium hydride, a metal, a metal hydride, and/or a metal oxide. Certain embodiments of the exemplary method include performing the chemical process by inducing a polymerization reaction where the chemical product is a treatment fluid additive, and/or performing the chemical process by adding a salt to water or a dilute brine.

The exemplary method includes transferring the amount of heat to the first fluid such that the first fluid is heated at least 50° C. The method further includes providing a heat transfer environment such that the treatment fluid at a wellhead fluidly coupled to the wellbore is not more than 10° C. warmer than a temperature of the first fluid before the transferring the amount of heat.

Another exemplary embodiment is a method including providing a first fluid, providing a first chemical reactant, performing a chemical process including the first chemical reactant, and transferring an amount of heat from the chemical process to the first fluid. The method further includes hydrating a polymer in the heated first fluid, and treating a formation of interest with a treatment fluid including the heated first fluid and a chemical product of the chemical process. The method further includes diluting the treatment fluid with respect to at least one constituent of the treatment fluid.

The exemplary method includes performing the chemical process by adding the first chemical reactant to the first fluid, where the first chemical reactant is a concentrated base, an anhydrous base, a concentrated acid, and/or an anhydrous acid. In certain embodiments, the method includes performing the chemical process by adding the first chemical reactant to the first fluid, providing a second chemical reactant and adding the second chemical reactant to the first fluid, where the first chemical reactant is a concentrated base or an anhydrous base, and where the second chemical reactant is a concentrated acid or an anhydrous acid. The method further includes selecting an amount of the first fluid, an amount and concentration of the first chemical reactant, and an amount and concentration of the second chemical reactant to form a brine having a specified salt concentration. The method may further include dynamically adjusting the specified salt concentration during the treating.

In certain embodiments, the method includes selecting an amount of the first fluid, an amount and concentration of the first chemical reactant, and an amount and concentration of the second chemical reactant to form a brine having a temperature of at least 50° C. In certain embodiments, the method includes selecting an amount of the first fluid, an amount and concentration of the first chemical reactant, and an amount and concentration of the second chemical reactant to form a brine having a temperature of at least 65° C. In certain embodiments, the method includes selecting an amount of the first fluid, an amount and concentration of the first chemical reactant, and an amount and concentration of the second chemical reactant to form a brine having a specified temperature. The method may further include adjusting the specified temperature during the treating.

In certain embodiments, the method includes adjusting a concentration of the polymer in the heated first fluid during the treating, and/or dynamically adjusting a concentration of the polymer in the treatment fluid at a wellhead fluidly coupled to the formation of interest during the treating.

In certain embodiments, the method includes stopping the treating before a pre-determined amount of the treatment fluid is injected into the formation of interest, where the pre-determined amount of the treatment fluid is a design amount of the first chemical reactant. The method further includes consuming less of the first chemical reactant than the design amount of the first chemical reactant. In an exemplary embodiment, the method includes continuing the treating after a pre-determined amount of the treatment fluid is injected into the formation of interest. In a further embodiment, the method includes continuing the treating such that at least 60 $m^3$ greater than the pre-determined amount of the treatment fluid is injected into the formation of interest.

Yet another exemplary embodiment is an apparatus including a treatment conditions module that interprets a specified pumping rate and a specified salt concentration, a hydration requirements module that determines a hydration vessel fluid volume and/or a specified temperature in response to the specified pumping rate, and a dynamic brine generation module that controls a flow rate of a first fluid, a base material, an acid material, and a polymer material into a hydration vessel in response to the specified salt concentration and the hydration vessel fluid volume and/or the specified temperature. The apparatus further includes a treatment fluid flow module that controls a flow rate of a treatment fluid from the hydration vessel in response to the specified pumping rate.

The treatment conditions module may further interpret the specified temperature, and the hydration requirements module determines the hydration vessel fluid volume in response to the specified pumping rate. Alternately, the treatment conditions module may interpret the hydration vessel fluid volume, and the hydration requirements module determines the specified temperature in response to the specified pumping rate. In certain embodiments, the hydration requirements module determines a hydration time in response to the specified temperature and/or a present temperature of the treatment fluid in the hydration vessel.

The treatment conditions module may further interpret a dynamically updated salt concentration, and the dynamic brine generation module controls the flow rate of the first fluid, the base material, the acid material, and the polymer material into the hydration vessel further in response to the dynamically updated salt concentration. The treatment conditions module may further interpret a dynamically updated gel loading concentration, and the dynamic brine generation module controls the flow rate of the polymer material into the hydration vessel further in response to the dynamically updated gel loading concentration.

Yet another exemplary embodiment is a system including a fluid source that provides a first fluid, a base source that provides a base material, and an acid source that provides an acid material, and a polymer source that provides a polymer material. The base material includes an anhydrous base and/or a concentrated base, and the acid material includes an anhydrous acid and/or a concentrated acid. The polymer material includes a polymer such as xanthan, hydroxy-ethyl-cellulose, guar, carboxy-methyl-hydroxy-propyl-guar, a poly-saccharide, a poly-saccharide derivative, a poly-acrylamide, a poly-acrylamide co-polymer, diutan, hydroxyl-propyl guar, and/or a synthetic polymer.

The system further includes a hydration vessel fluidly coupled to the fluid source, the base source, the acid source, and the polymer source. The system further includes a fluid conduit fluidly coupled to the base source, acid source, and polymer source on an upstream side and fluidly coupled to a treatment pump on a downstream side, and a controller structured to: control a flow rate of a treatment fluid from the hydration vessel at a specified pumping rate, and to control a flow rate of the first fluid, the base material, the acid material, and the polymer material into the hydration vessel such that the treatment fluid residing in the hydration vessel comprises a specified salt concentration and such that an average residence time of the treatment fluid in the hydration vessel is at least equal to a hydration time.

The exemplary system further includes a bypass line fluidly coupling a diluted fluid to the treatment fluid downstream of the hydration vessel, where the diluted fluid may be the first fluid. In certain embodiments, the system further includes one or more heat exchangers thermally coupled to the fluid conduit, where the controller controls the heat exchanger(s) such that a temperature of the treatment fluid exiting the fluid conduit is not more than 10° C. warmer than a temperature of the first fluid. An embodiment of the system includes the heat exchanger transferring thermal energy from the treatment fluid in the fluid conduit to the first fluid and/or an ambient fluid.

In certain embodiments, the controller further interprets a dynamically updated salt concentration and controls the flow rate of the first fluid, the base material, the acid material, and the polymer material into the hydration vessel such that the treatment fluid residing in the hydration vessel includes the dynamically updated salt concentration. In certain embodiments, the controller further interprets a dynamically updated gel loading and controls the flow rate of the first fluid, the base material, the acid material, and the polymer material into the hydration vessel such that the treatment fluid residing in the hydration vessel includes the dynamically updated gel loading.

In certain embodiments, the controller further interprets a dynamically updated temperature and controls the flow rate of the first fluid, the base material, the acid material, and the polymer material into the hydration vessel such that the treatment fluid residing in the hydration vessel includes the dynamically updated temperature. In certain embodiments, the controller further interprets a temperature of the treatment fluid in the hydration vessel and determines the hydration time in response to the temperature of the treatment fluid in the hydration vessel. In certain embodiments, the controller further interprets a specified temperature and controls a flow rate of the first fluid, the base material, the acid material, and the polymer material into the hydration vessel such that the treatment fluid residing in the hydration vessel includes the specified temperature. The specified temperature may be a temperature at least 50° C. warmer than a temperature of the first fluid, a temperature of at least 65° C., and/or a temperature determined in response to an available volume of the hydration vessel and the specified pumping rate.

While the invention has been illustrated and described in detail in the drawings and foregoing description, the same is to be considered as illustrative and not restrictive in character, it being understood that only certain exemplary embodiments have been shown and described and that all changes and modifications that come within the spirit of the inventions are desired to be protected. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:
1. A method, comprising:
performing a chemical process to create a chemical product and releasing an amount of heat;
transferring at least a portion of the amount of heat to a first fluid, and hydrating an amount of polymer in the first fluid;

combining the chemical product with the first fluid to generate a treatment fluid; and
treating a formation of interest with the treatment fluid, the formation of interest intersecting a wellbore,
wherein the performing comprises at least inducing a polymerization reaction, the chemical product comprising a fluid treatment additive.

2. The method of claim 1, further comprising diluting the treatment fluid with respect to at least one constituent of the treatment fluid.

3. The method of claim 1, wherein the performing further the comprises performing at least one process selected from the processes consisting of: a solid dissolution, a gas dissolution, a liquid dissolution, a liquid dilution, and a chemical reaction.

4. The method of claim 1, wherein the performing further comprises mixing an acid with a base.

5. The method of claim 4, wherein the chemical product further comprises a salt selected from the group consisting of sodium chloride, potassium chloride, ammonium chloride, tetramethyl ammonium chloride, calcium chloride, magnesium chloride, sodium bromide, calcium bromide, zinc bromide, potassium formate, cesium formate, and zinc chloride.

6. The method of claim 1, wherein the performing further comprises performing at least one process selected from the group consisting of:
mixing an anhydrous base with one of water and a diluted base;
diluting a concentrated base;
mixing an anhydrous acid with one of water and a diluted acid; and
diluting a concentrated acid.

7. The method of claim 1, wherein the performing further comprises adding a base material to one of water and a diluted base, the base material comprising one of an anhydrous base and a concentrated base, and wherein the base material comprises at least one material selected from the group consisting of sodium hydroxide, potassium hydroxide, ammonia, tetramethyl ammonium hydroxide, and cesium hydroxide.

8. The method of claim 1, wherein the performing further comprises adding an acid material to one of water and a diluted acid, the acid material comprising one of an anhydrous acid and a concentrated acid, and wherein the acid material comprises at least one material selected from the group consisting of HCl(g), HCl(aq), HBr(g), HBr(aq), HI(g), HI(aq), and formic acid.

9. The method of claim 1, wherein the performing further comprises adding a clay stabilizer precursor to water, the clay stabilizer precursor comprising at least one material selected from the group consisting of sodium, potassium, magnesium, sodium hydride, lithium hydride, calcium hydride, magnesium hydride, a metal, a metal hydride, and a metal oxide.

10. The method of claim 1, wherein the performing further comprises adding a salt to water.

11. The method of claim 1, wherein the transferring the amount of heat to the first fluid comprises heating the first fluid to a temperature of at least 50° C.

12. The method of claim 11, further comprising providing a heat transfer environment such that the treatment fluid at a wellhead fluidly coupled to the wellbore is not more than 10° C. warmer than a temperature of the first fluid before the transferring the amount of heat.

13. A method, comprising:
providing a first fluid;
providing a first chemical reactant;
performing a chemical process by adding the first chemical reactant to the first fluid;
providing a second chemical reactant comprising one of a concentrated acid and an anhydrous acid;
adding the second chemical reactant to the first fluid;
selecting an amount of the first fluid, an amount and concentration of the first chemical reactant, and an amount and concentration of the second chemical reactant to form a brine having at least a specified salt concentration;
transferring an amount of heat from the chemical process to the first fluid;
hydrating a polymer in the heated first fluid; and
treating a formation of interest with a treatment fluid comprising the heated first fluid and a chemical product of the chemical process.

14. The method of claim 13, further comprising diluting the treatment fluid with respect to at least one constituent of the treatment fluid.

15. The method of claim 13, wherein the first chemical reactant comprises one of a concentrated base and an anhydrous base.

16. The method of claim 13, wherein the first chemical reactant comprises one of a concentrated acid and an anhydrous acid.

17. The method of claim 13, wherein the brine has a temperature of at least 50° C.

18. The method of claim 13, wherein the brine has a temperature of at least 65° C.

19. The method of claim 13, wherein the brine has a specified temperature.

20. The method of claim 13, further comprising dynamically adjusting the specified salt concentration during the treating.

21. The method of claim 19, further comprising dynamically adjusting the specified temperature during the treating.

22. The method of claim 13, further comprising dynamically adjusting a concentration of the polymer in the heated first fluid during the treating.

23. The method of claim 13, further comprising dynamically adjusting a concentration of the polymer in the treatment fluid at a wellhead fluidly coupled to the formation of interest during the treating.

24. The method of claim 13, further comprising:
stopping the treating before a pre-determined amount of the treatment fluid is injected into the formation of interest, the pre-determined amount of the treatment fluid corresponding to a design amount of the first chemical reactant; and
consuming less of the first chemical reactant than the design amount of the first chemical reactant.

25. The method of claim 13, further comprising continuing the treating after a pre-determined amount of the treatment fluid is injected into the formation of interest.

26. The method of claim 25, further comprising continuing the treating such that at least 60 $m^3$ greater than the pre-determined amount of the treatment fluid is injected into the formation of interest.

* * * * *